United States Patent
Cho

(10) Patent No.: US 9,709,804 B2
(45) Date of Patent: Jul. 18, 2017

(54) LENS, LIGHT SCANNING UNIT, AND ELECTROPHOTOGRAPHY TYPE IMAGE FORMING APPARATUS

(71) Applicant: Samsung Electronics Co., Ltd., Suwon-si (KR)

(72) Inventor: Won-young Cho, Suwon-si (KR)

(73) Assignee: S-PRINTING SOLUTION CO., LTD., Suwon-si (KR)

(*) Notice: Subject to any disclaimer, the term of this patent is extended or adjusted under 35 U.S.C. 154(b) by 0 days.

(21) Appl. No.: 14/743,216

(22) Filed: Jun. 18, 2015

(65) Prior Publication Data
US 2015/0370192 A1    Dec. 24, 2015

(30) Foreign Application Priority Data
Jun. 18, 2014    (KR) .................. 10-2014-0074507

(51) Int. Cl.
| B41J 2/45 | (2006.01) |
| G02B 26/12 | (2006.01) |
| G03G 15/04 | (2006.01) |
| G03G 15/043 | (2006.01) |
| G02B 13/00 | (2006.01) |

(52) U.S. Cl.
CPC .......... *G02B 26/125* (2013.01); *B41J 2/451* (2013.01); *G02B 13/0005* (2013.01); *G03G 15/0409* (2013.01); *G03G 15/0435* (2013.01); *G03G 15/04045* (2013.01)

(58) Field of Classification Search
CPC ....... B41J 2/451; G02B 26/124; G02B 26/125
See application file for complete search history.

(56) References Cited

U.S. PATENT DOCUMENTS

| 6,504,657 B1* | 1/2003 | Ono ................. G02B 26/125 264/1.1 |
| 2003/0025784 A1* | 2/2003 | Sato ................. G02B 26/125 347/244 |
| 2005/0007547 A1* | 1/2005 | Jones ................. G02C 7/021 351/159.01 |
| 2006/0209294 A1 | 9/2006 | Murata |

FOREIGN PATENT DOCUMENTS

JP    10-256649    9/1998

\* cited by examiner

*Primary Examiner* — Kristal Feggins
*Assistant Examiner* — Kendrick Liu
(74) *Attorney, Agent, or Firm* — Staas & Halsey LLP

(57) ABSTRACT

A lens, a light scanning unit, and an electrophotography type image forming apparatus includes effective optical surfaces, wherein reference indicating portions to measure a decenter of the lens are arranged on the effective optical surfaces.

12 Claims, 9 Drawing Sheets

LENS, LIGHT SCANNING UNIT, AND ELECTROPHOTOGRAPHY TYPE IMAGE FORMING APPARATUS

CROSS-REFERENCE TO RELATED APPLICATIONS

This application claims the priority benefit of Korean Patent Application No. 10-2014-0074507, filed on Jun. 18, 2014, in the Korean Intellectual Property Office, the disclosure of which is incorporated herein in its entirety by reference.

BACKGROUND

1. Field

The following description relates to a lens having a structure for precisely measuring decenter, a light scanning unit, and an electrophotography type image forming apparatus.

2. Description of the Related Art

An electrophotography type image forming apparatus, such as a laser printer, a digital copying machine, or a multi-functional printer (MFP), forms an electrostatic latent image by scanning a light to a photosensitive body via a light scanning unit. The formed electrostatic latent image is developed to a developed image by using a developing agent, such as toner, and the developed image is transferred onto a printing medium.

A light scanning unit is a device for scanning a light emitted by a light source to a designated region, includes a light deflector for scanning a light beam emitted by a light source to a photosensitive body, and includes an optical element (lens) for refracting a light beam emitted by a light source and forming an image therefrom. Optical elements of a light scanning unit includes a collimator lens for collimating a light beam emitted by a light source, a cylindrical lens for focusing a light beam onto a reflective surface of a light deflector, a synchronization detecting lens for detecting synchronization of light beams scanned by a light deflector, and a scanning lens for forming an image on a photosensitive body by using light beam scanned by a light deflector.

Optical elements (lenses) of such a light scanning unit are generally injection-molded. However, due to errors of a mold for injection-molding or various conditions during an injection-molding process, there may be errors in a shape of a lens.

Recently, sizes of lenses have decreased along with the miniaturization of light scanning units, and thus, decenter requirements for lenses are stricter than ever. However, there is no method of precisely measuring interfacial decenter and no method of reducing interfacial decenter.

SUMMARY

One or more embodiments of the present disclosure include a lens having a structure for precisely measuring decenter, a light scanning unit, and an electrophotography type image forming apparatus.

Additional aspects will be set forth in part in the description which follows and, in part, will be apparent from the description, or may be learned by practice of the presented embodiments.

According to one or more embodiments of the present disclosure, a lens includes a lens unit having effective optical surfaces, wherein reference indicating portions for measuring decenter are arranged on the effective optical surfaces.

The effective optical surfaces include an emission surface and an incidence surface of the lens unit, and the reference indicating portions include at least one first reference point and at least one second reference point respectively formed on the emission surface and the incidence surface of the lens unit.

The at least one first reference point and the at least one second reference point are formed at regions of the emission surface and the incidence surface of the lens unit, the regions being regions other than regions through which light beams effectively pass.

The at least one first reference point is arranged at a point of origin of the emission surface of the lens unit, and the at least one second reference point is arranged at a point of origin of the incidence surface of the lens unit.

The at least one first reference point are symmetrically arranged on the emission surface of the lens unit around a point of origin at regions other than the point of origin, and the at least one second reference point are symmetrically arranged on the incidence surface of the lens unit around a point of origin at regions other than the point of origin.

The at least one first reference point is arranged on a main scanning line passing through a point of origin on the emission surface of the lens unit, and the at least one second reference point is arranged on a main scanning line passing through a point of origin on the incidence surface of the lens unit.

The at least one first reference point is arranged on a sub scanning line passing through a point of origin on the emission surface of the lens unit, and the at least one second reference point is arranged on a sub scanning line passing through a point of origin on the incidence surface of the lens unit.

The at least one first reference point are arranged symmetrically with respect to a main scanning line passing through a point of origin on the emission surface of the lens unit, and the at least one second reference point are arranged symmetrically with respect to a main scanning line passing through a point of origin on the incidence surface of the lens unit.

The at least one first reference point is arranged symmetrically with respect to a sub scanning line passing through a point of origin on the emission surface of the lens unit, and the at least one second reference point is arranged symmetrically with respect to a sub scanning line passing through a point of origin on the incidence surface of the lens unit.

The at least one first reference point and the at least one second reference point are in the form of one selected from hemispherical protrusions, cylindrical protrusions, elliptical protrusions, polygonal protrusions, hemispherical grooves, cylindrical grooves, elliptical grooves, and polygonal grooves.

According to one or more embodiments of the present disclosure, a method of measuring decenter of a lens, which includes effective optical surfaces having formed thereon reference indicating portions, the method includes a first stage for forming mold-side reference indicators at a mold for molding a lens; a second stage for forming the lens by using the mold; a third stage for detecting locations of reference indicating portions of the lens; a fourth stage for measuring decenter by merging measured location data regarding the reference indicating portions of the lens; a fifth stage for determining whether the measured decenter of the reference indicating portions of the lens is smaller than an allowed decenter; and, if the measured decenter of the reference indicating portions of the lens is greater than the allowed decenter, re-processing the mold by shifting point of origins of optical surfaces of the mold to compensate for the measured decenter and repeating the first through fifth stages.

The mold-side reference indicators are formed on an optical surface of the mold corresponding to the incidence surface of the lens and an optical surface of the mold corresponding to the emission surface of the lens.

A point of origin on the incidence surface of the lens and a point of origin on the emission surface of the lens are detected by detecting locations of the reference indicating portions of the lens.

The decenter is obtained by calculating a relative location between coordinates of the first reference point on the incidence surface of the lens and coordinates of the second reference point on the emission surface of the lens.

The method further includes merging scanning coordinates on the incidence surface of the lens and scanning coordinates on the emission surface of the lens.

The merging of the scanning coordinates on the incidence surface and the emission surface of the lens includes attaching reference indicating portions that provide scanning coordinates reference points to the lens or a jig that fixes the lens while the lens is being scanned; and fitting a first scanning coordinate reference point on the incidence surface provided by a first reference indicating portion detected when the incidence surface of the lens is scanned to a second scanning coordinate reference point on the emission surface provided by a second reference indicating portion detected when the emission surface of the lens is scanned.

According to one or more embodiments of the present disclosure, a light scanning unit includes a light source, which emits a light beam; a light deflector, which deflects the light beam emitted by the light source and scans the deflected light beam in a main scanning direction; incidence optics, which lead the light beam emitted by the light source to be incident to the light deflector; and imaging optics, which form an image of the light beam deflection-scanned by the light deflector on a surface to be scanned, wherein at least one optics among the incidence optics and the imaging optics include lens unit including effective optical surfaces, and reference indicating portions for measuring decenter are arranged on the effective optical surfaces.

The imaging optics include a scanning lens having an fθ characteristic for correcting light beams to be scanned to the surfaces to be scanned at a constant velocity, and the reference indicating portions for measuring decenter are arranged on effective optical surfaces of the scanning lens.

The light source emits at least two light beams, the imaging optics include a scanning lens through which the at least two light beams pass, and a first reference point and a second reference point of the lens are arranged on the incidence surface and the emission surface of the scanning lens at regions other than transmissive regions through which the at least two light beams pass.

The incidence optics and the imaging optics are tilted optics in which the at least two light beams are incident to one of reflective surfaces of the light deflector at tilted angles.

The light source emits at least one light beam, the imaging optics includes a scanning lens through which one light beam passes, and first reference points and second reference points of the lens are respectively arranged symmetrically with respect to a sub scanning line on the incidence surface and the emission surface of the scanning lens around scanning regions to which the one light beam is scanned.

According to one or more embodiments of the present disclosure, an electrophotography type image forming apparatus includes the light scanning unit; a developer, which includes a photosensitive body, which is arranged where an image of a light beam emitted by the light scanning unit is formed, for forming an electrostatic latent image thereon; and a developing roller for developing the electrostatic latent image formed on the photosensitive body; and a transferring unit for transfer an image developed by the developer onto a printing medium.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
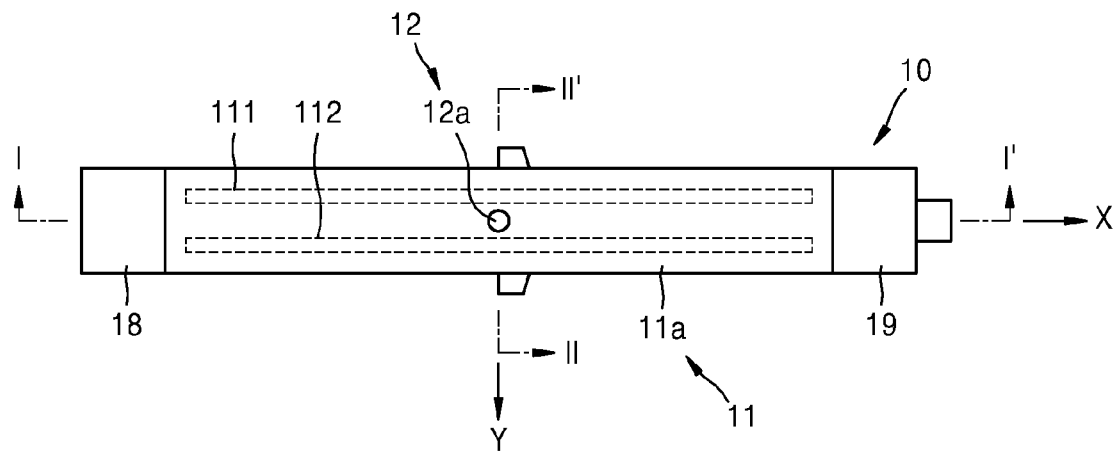
FIG. 1A is a diagram showing an incidence surface of a lens according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

Figure 1B:
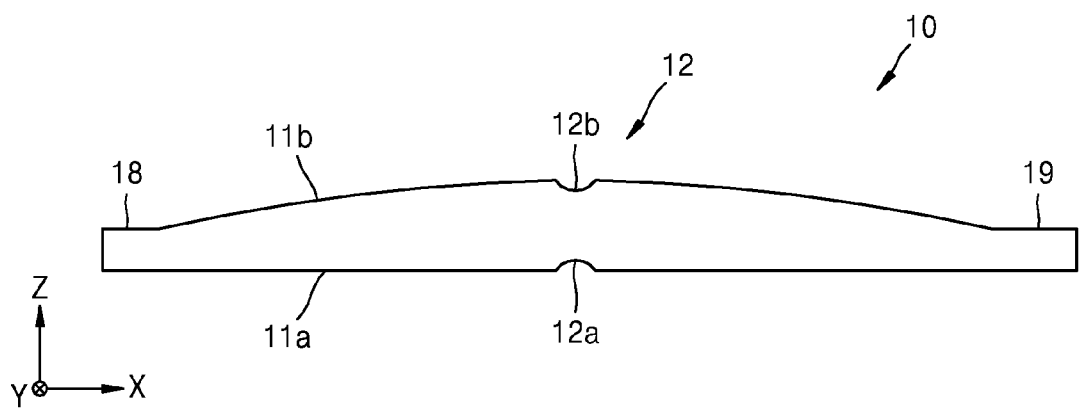
FIG. 1B is a sectional view of the lens, taken along a line I-I' of FIG. 1A.
Figure 1C:
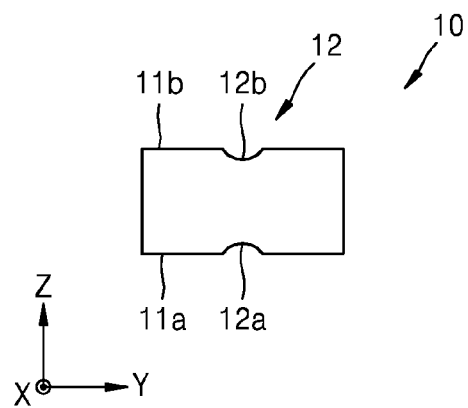
FIG. 1C is a sectional view of the lens, taken along a line II-II' of FIG. 1A.

FIG. 1A is a diagram showing an incidence surface of a lens 10 according to an embodiment of the present disclosure, FIG. 1B is a sectional view of the lens 10, taken along a line I-I' of FIG. 1A, and FIG. 1C is a sectional view of the lens 10, taken along a line II-II' of FIG. 1A. In FIGS. 1A through 1C, the x-axis direction indicates a main scanning direction, the y-axis direction indicates a sub scanning direction, and the z-axis direction indicates an optical axis direction. Here, the main scanning direction refers to a direction in which a light beam is deflected by rotation of a light deflector (150 of FIG. 7) when viewed from a surface to be scanned, whereas the sub scanning direction refers to a direction that is perpendicular to both a direction in which the light beam travels and the main scanning direction. As described below, the sub scanning direction corresponds to a direction in which the surface to be scanned is moved by revolution of a photosensitive drum (210 of FIG. 8).

Referring to FIGS. 1A through 1C, the lens 10 includes a lens unit 11 having effective optical surfaces and flange portions 18 and 19 that are arranged at two opposite side of the lens unit 11. The lens unit 11 is formed to extend in the main scanning direction (x-axis direction) to cover the entire light beam scanned by the light deflector (150 of FIG. 7). The optical surfaces are spherical or aspherical refractive surfaces formed on two opposite surfaces of the lens unit 11, that is, an incidence surface 11a and an emission surface 11b. The flange portions 18 and 19 are combined with a lens holder (not shown) arranged at the housing of a light scanning unit (100 of FIG. 7), thereby fixing the lens 10. The flange portions 18 and 19 may be omitted.

The lens 10 as described above may be formed of a plastic resin via injection-molding. However, decenter may be formed at the lens 10 while the lens 10 is being manufactured. Causes of decenter includes manufacturing errors of a mold or deformation during injection-molding, where decenter may not be reduced without resolving both of the causes. Decenter may be reduced by manufacturing a mold as precise as possible, measuring decenter of the lens 10, and shifting the point of origin of optical surfaces of the mold in a direction to compensate the decenter.

Reference indicating portions 12 are arranged at the incidence surface 11a and the emission surface 11b of the lens unit 11. The reference indicating portions 12 are portions for measuring decenter of the lens 10 and may be used to compensate decenter that may occur while the lens 10 is being manufactured. The reference indicating portions 12 may include one first reference point 12a arranged on the incidence surface 11a and one second reference point 12b arranged on the emission surface 11b. The first and second reference points 12a and 12b may be formed as hemispherical protrusions, cylindrical protrusions, elliptical protrusions, polygonal protrusions, hemispherical grooves, cylindrical grooves, elliptical grooves, or polygonal grooves. However, the present disclosure is not limited thereto. Shapes of the first and second reference points 12a and 12b are not limited as long as the first and second reference points 12a and 12b are detectable.

It is assumed that the lens 10 according to the present embodiment is used as a common scanning lens (160 of FIG. 7) with respect to two light beams scanned in the main scanning direction (x-axis direction). Here, when viewed from the incidence surface 11a, the two light beams may be expected to pass on transmissive regions 111 and 112. The transmissive regions 111 and 112 are a designated distance apart from each other in the sub scanning direction (y-axis direction). The first and second reference points 12a and 12b are arranged between the transmissive regions 111 and 112 not to interfere with scanning of two light beams. Furthermore, the first reference point 12a may be arranged at the point of origin of the incidence surface 11a, whereas the second reference point 12b may be arranged at the point of origin of the emission surface 11b. The point of origins of the incidence surface 11a and the emission surface 11b refer to the center in terms of designing the lens 10. The point of origins of the incidence surface 11a and the emission surface 11b may be the most convex portions or the most concave portions on the incidence surface 11a and the emission surface 11b. In other words, the point of origins of the incidence surface 11a and the emission surface 11b may be vertexes of the incidence surface 11a and the emission surface 11b, respectively. There may be a deviation between the point of origin of the incidence surface 11a and the point of origin of the emission surface 11b in the actually manufactured lens 10, and thus the first reference point 12a of the incidence surface 11a and the second reference point 12b of the emission surface 11b may not be aligned with each other when viewed from the main scanning plane (X-Y plane). Hereafter, the deviation between the point of origin of the incidence surface 11a and the point of origin of the emission surface 11b refers to an interfacial decenter. When coordinates of the first reference point 12a of the incidence surface 11a and the second reference point 12b of the emission surface 11b on the main scanning plane (X-Y plane) are measured, the interfacial decenter may be calculated.

As described above, according to the present embodiment, interfacial decenter is measured by arranging the reference indicating portions 12 on both the incidence surface 11a and the emission surface 11b. However, the present disclosure is not limited thereto. The reference indicating portion 12 may be arranged only on either the incidence surface 11a or the emission surface 11b of the scanning lens 10 to measure decenter at the corresponding surface.

Figure 2A:
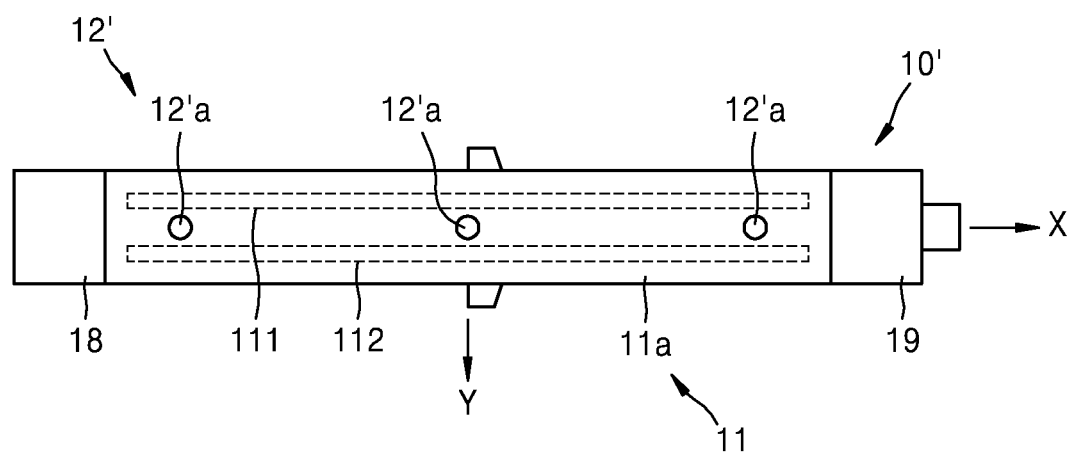
FIGS. 2A, 2B, and 2C are diagrams showing lenses according to embodiments of the present disclosure.
Figure 2B:
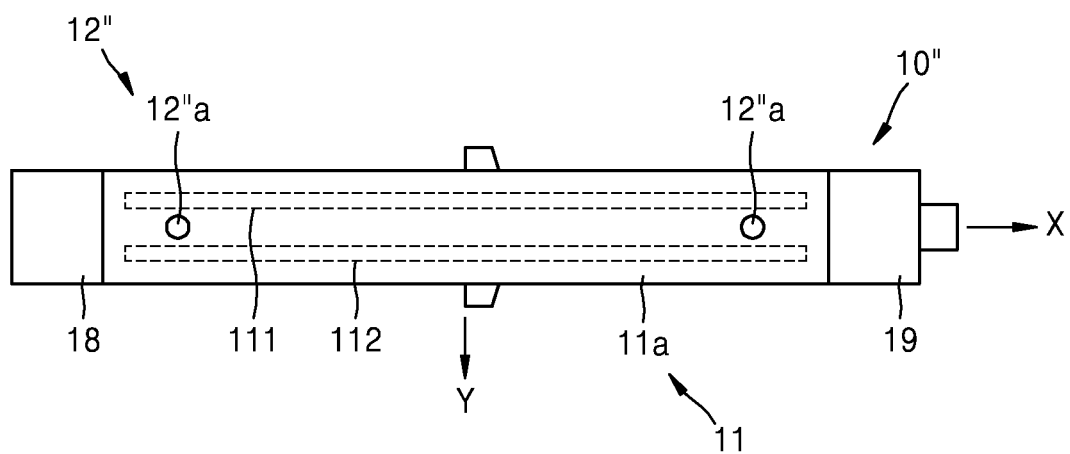
Figure 2C:
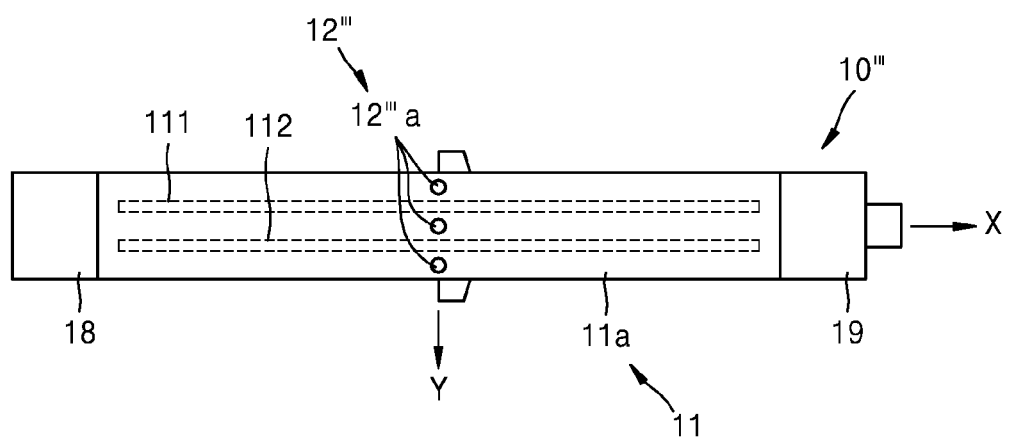

FIGS. 2A through 2C are diagrams showing lenses 10', 10", and 10''' according to embodiments of the present disclosure.

Referring to FIG. 2A, a reference indicating portion 12' arranged at the lens 10' may include a plurality of first reference points 12'a arranged in the main scanning direction (x-axis direction) of the incidence surface 11a of the lens 10'. One from among the plurality of first reference points 12'a may be located at the point of origin of the incidence surface 11a. Furthermore, the remaining of the plurality of first reference points 12'a may be symmetrically arranged around the point of origin of the incidence surface 11a in the main scanning direction (x-axis direction). In other words, the plurality of first reference points 12'a may be located on the main scanning line passing through the point of origin of the incidence surface 11a of the lens 10'. As described above, the plurality of first reference points 12'a are symmetrically arranged around the points of origin of the incidence surface 11a and the emission surface 11b, respectively. The point of origin of the incidence surface 11a of the lens 10' may be measured more precisely, and deformation in the main scanning direction may also be measured. Although not shown in FIG. 2A, a plurality of second reference points may be arranged on the emission surface of the lens 10' in a similar manner. In other words, the plurality of second reference points may be symmetrically arranged on the emission surface of the lens 10' around the point of origin in the main scanning direction (x-axis direction). Furthermore, the plurality of second reference points may be arranged at locations corresponding to the plurality of first reference points when viewed from the main scanning plane (X-Y plane).

For another example, referring to FIG. 2B, in a reference indicating portion 12" arranged on the lens 10", a plurality of first reference points 12"a may be symmetrically arranged on the incidence surface 11a of the lens 10" around the point of origin in the main scanning direction (x-axis direction), where no first reference point 12"a may be arranged at the point of origin. Because the plurality of first reference points 12"a are symmetrically arranged around the point of origin in the main scanning direction (x-axis direction), the location of the point of origin of the incidence surface $11a$ may be precisely detected by precisely measuring locations of the plurality of first reference point $12''a$. Furthermore, by not arranging the first reference point $12''a$ at the point of origin of the incidence surface $11a$, deformation around the point of origin of the incidence surface $11a$ may be minimized. Although not shown in FIG. 2B, a plurality of second reference points may be arranged on the emission surface of the lens $10''$ in a similar manner. In other words, the plurality of second reference points may be symmetrically arranged on the emission surface of the lens $10''$ around the point of origin in the main scanning direction (x-axis direction) and may not be arranged at the point of origin.

For another example, referring to FIG. 2C, a reference indicating portion $12'''$ arranged at the lens $10'''$ may include a plurality of first reference points $12'''a$ arranged in the sub scanning direction (y-axis direction) of the incidence surface $11a$ of the lens $10'''$. In other words, the plurality of first reference points $12'''a$ may be located on the sub scanning line passing through the point of origin of the incidence surface $11a$ of the lens $10'''$. Furthermore, one from among the plurality of first reference points $12'''a$ may be located at the point of origin of the incidence surface $11a$, whereas the remaining of the plurality of first reference points $12'''a$ may be symmetrically arranged around the point of origin of the incidence surface $11a$ in the sub scanning direction (y-axis direction). As described above, the lens $10'''$ may be common with respect to two light beams scanned in the main scanning direction (x-axis direction), and the two light beams may be expected to pass through the two transmissive regions $111$ and $112$, respectively. Therefore, the first reference point $12'''a$ may be arranged outside the two transmissive regions $111$ and $112$ not to intrude on the transmissive regions $111$ and $112$. In other example, the plurality of first reference point $12'''a$ may be symmetrically arranged on the sub scanning line except the point of origin of the incidence surface $11a$. Although not shown in FIG. 2C, a plurality of second reference points may be arranged on the emission surface of the lens $10'''$ in a similar manner. In other words, the plurality of second reference points may be symmetrically arranged on the emission surface of the lens $10'''$ around the point of origin in the sub scanning direction (y-axis direction).

Figure 3A:
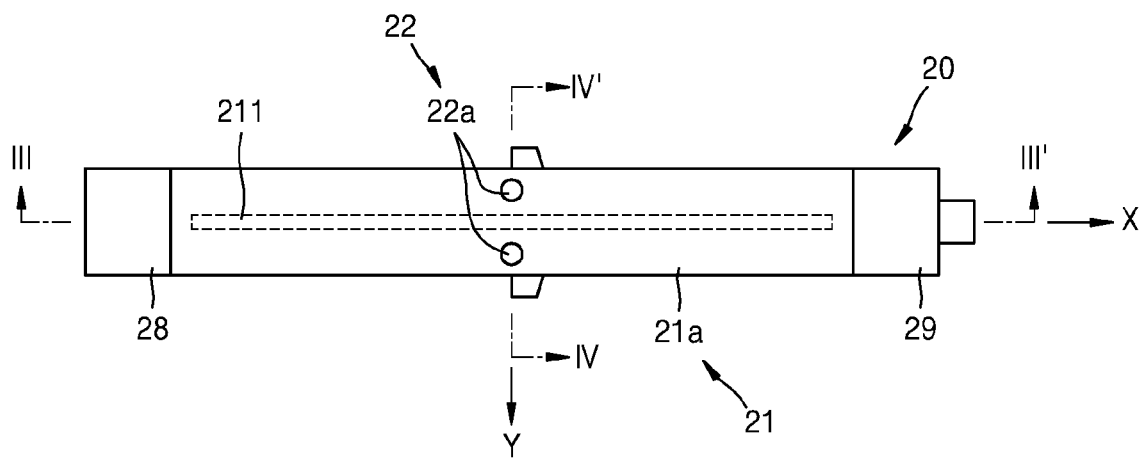
FIG. 3A is a diagram showing an incidence surface of a lens according to an embodiment of the present disclosure.
Figure 3B:
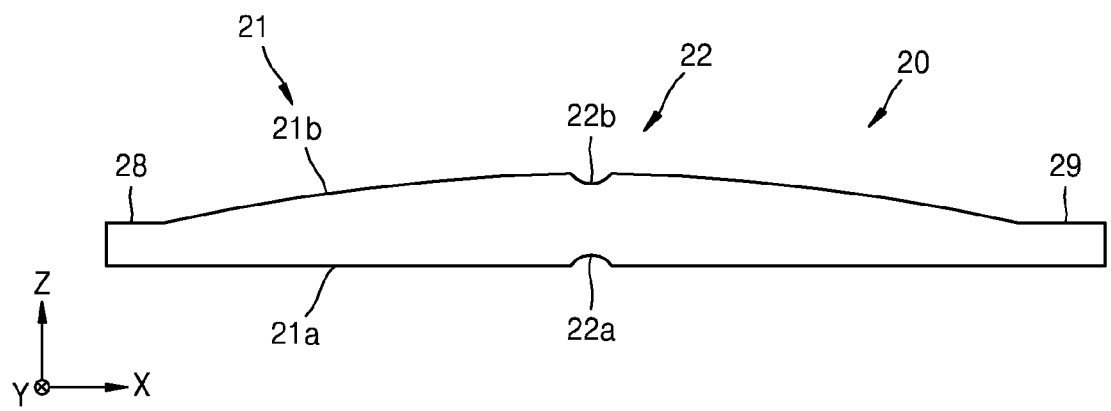
FIG. 3B is a sectional view of the lens, taken along a line III-III' of FIG. 3A.
Figure 3C:
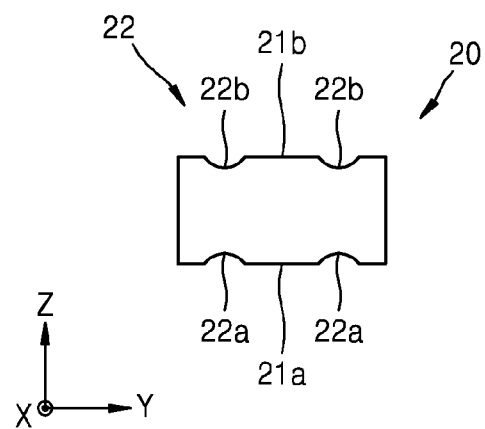
FIG. 3C is a sectional view of the lens, taken along a line IV-IV' of FIG. 3A.

FIG. 3A is a diagram showing an incidence surface of a lens $20$ according to an embodiment of the present disclosure, FIG. 3B is a sectional view of the lens $20$, taken along a line III-III' of FIG. 3A, and FIG. 3C is a sectional view of the lens $20$, taken along a line IV-IV' of FIG. 3A.

Referring to FIGS. 3A through 3C, the lens $20$ includes a lens unit $21$ having effective optical surfaces and flange portions $28$ and $29$ that are arranged at two opposite side of the lens unit $21$. The lens unit $21$ is formed to extend in the main scanning direction (x-axis direction) to cover the entire light beam scanned by the light deflector ($150$ of FIG. 7). Reference indicating portions $22$ are arranged at the incidence surface $21a$ and the emission surface $21b$ of the lens unit $21$. The reference indicating portions $22$ may include two first reference points $22a$ arranged on the incidence surface $21a$ in the sub scanning direction (y-axis direction) and two second reference point $22b$ arranged on the emission surface $21b$ in the sub scanning direction (y-axis direction). Locations of the first reference points $22a$ and locations of the second reference points $22b$ may overlap each other when viewed from the main scanning plane (X-Y plane).

It is assumed in the present embodiment that the lens $20$ is used as a scanning lens ($160$ of FIG. 7) used with respect to one light beam. In other words, one light beam is expected to pass through a transmissive region $211$ extending in the main scanning direction (x-axis direction). Therefore, the first reference points $22a$ and the second reference points $22b$ are arranged by interposing the one transmissive region $211$ therebetween to not to interfere with scanning of the one light beam.

The transmissive region $211$ may be a region including the point of origin of the incidence surface $21a$ and the point of origin of the emission surface $21b$. In other words, a light beam may be expected to pass through the points of origin of the incidence surface $21a$ and the emission surface $21b$ or to travel nearby the points of origin. In other words, the transmissive region $211$ may be understood as a region including a main scanning line passing through the points of origin. In this case, the two first reference points $22a$ may be symmetrically arranged around the point of origin of the incidence surface $21a$ in the sub scanning direction (y-axis direction), whereas the two second reference points $22b$ may be symmetrically arranged around the point of origin of the emission surface $21b$ in the sub scanning direction (y-axis direction). In other words, the two first reference points $22a$ and the two second reference points $22b$ may be located on sub scanning lines which pass through the point of origins of the incidence surface $21a$ and the emission surface $21b$, respectively.

Figure 4A:
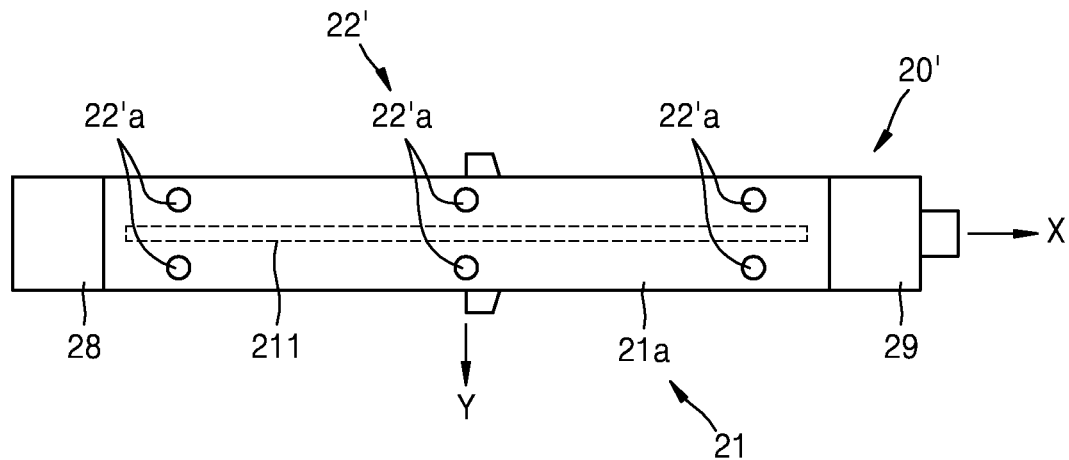
FIGS. 4A and 4B are diagrams showing lenses according to embodiments of the present disclosure.
Figure 4B:
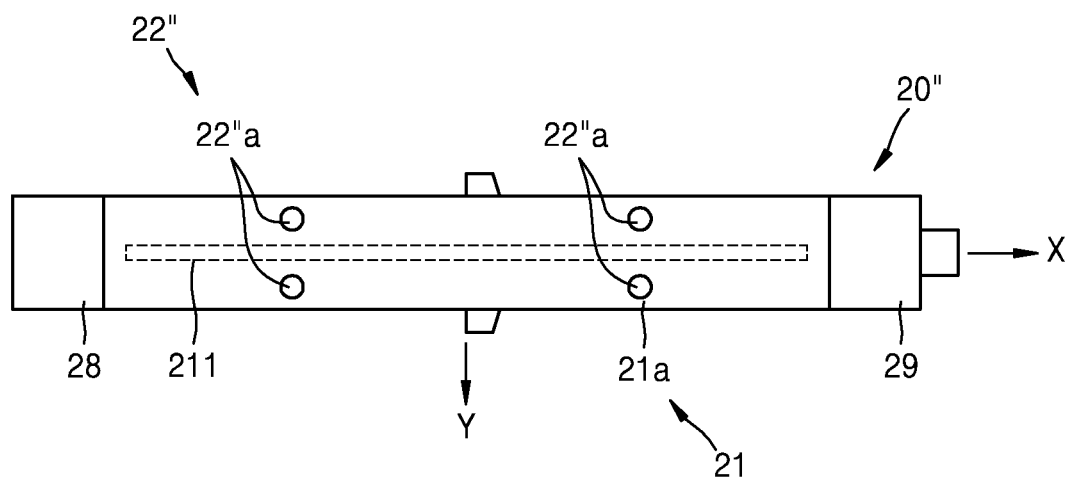

FIGS. 4A and 4B are diagrams showing lenses according to embodiments of the present disclosure.

Referring to FIG. 4A, a reference indicating portion $22'$ arranged at a lens $20'$, which is arranged at the lens $20'$, may include a plurality of first reference points $22'a$ arranged in the main scanning direction (x-axis direction) and the sub scanning direction (y-axis direction). The plurality of first reference points $22'a$ may be formed on two main scanning lines. Furthermore, the plurality of first reference points $22'a$ may be symmetrically arranged around a main scanning line passing through a point of origin. In other words, from among the plurality of first reference points $22'a$, reference points at the center of the main scanning direction (x-axis direction) may be symmetrically arranged on a sub scanning lines passing through the point of origin of the incidence surface $21a$, whereas the remaining of the plurality of first reference points $22'a$ may be symmetrically arranged in the main scanning direction (x-axis direction) around a sub scanning line passing through the point of origin of the incidence surface $21a$.

Referring to FIG. 4B, in a reference indicating portion $22''$ arranged at a lens $20''$, a plurality of first reference points $22''a$ may be symmetrically arranged on the incidence surface $21a$ of the lens $20''$ around the point of origin in the main scanning direction (x-axis direction) and the sub scanning direction (y-axis direction), where no reference point may be arranged on a sub scanning line passing through an point of origin.

Although not shown in FIGS. 4A and 4B, a plurality of second reference points may be arranged on the emission surfaces of the lenses $20'$ and $20''$ in a similar manner. In other words, when viewed from the main scanning plane (X-Y plane), second reference points may be arranged on the emission surfaces of the lenses $20'$ and $20''$ at locations overlapping those of the first reference points $22'a$ and $22''a$ of emission surface $21b$.

Although the above descriptions regarding the lenses $10'$, $10''$, $10'''$, $20$, $20'$, and $20''$ relate to a case in which reference points are arranged on an incidence surface and an emission surface in the main scanning direction or the sub scanning direction. However, reference points may be arranged on incidence surfaces and emission surfaces in both the main scanning direction and the sub scanning direction Furthermore, although the above descriptions regarding the lenses 10', 10", 10''', 20, 20', and 20" given above with reference to FIGS. 2A through 4C relate to a case in which reference points are symmetrically arranged around points of origin. However, the present disclosure is not limited thereto. Even if reference points are not symmetrically arranged around a point of origin, arrangements of the reference points are not limited to symmetrical arrangements as long as the point of origin may be calculated based on the reference points.

Furthermore, although the lenses 10, 10', 10", 10''', 20, 20', and 20" and methods of measuring decenter thereof as described above with reference to FIGS. 1A through 4B are described based on a scanning lens of a light scanning unit, the present disclosure is not limited thereto. It would be obvious to one of ordinary skill in the art that, in lenses other than a scanning lens, reference indicating portions for calculating points of origin may be arranged at regions other than effective regions through which light beams pass, thereby precisely measuring (interfacial) decenter. For example, regardless to the main scanning direction and the sub scanning direction, reference points may be arranged on an incidence surface and an emission surface at point of origin of a lens or symmetrically around the point of origin.

Next, a method of measuring decenter of a lens according to an embodiment of the present disclosure will be described.

Figure 5:
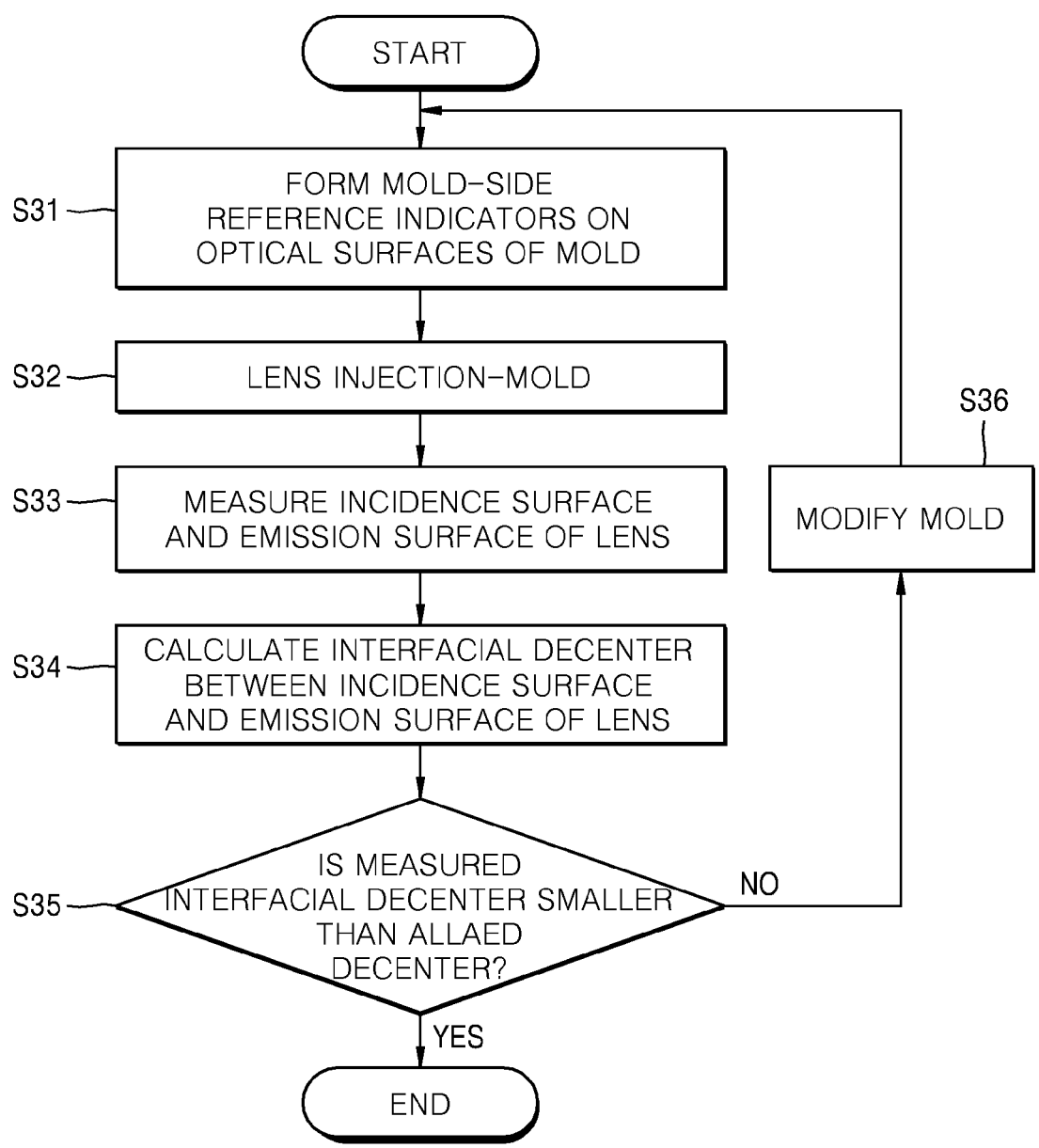
FIG. 5 is a flowchart for describing a method of measuring decenter of a lens according to an embodiment of the present disclosure.

FIG. 5 is a flowchart for describing a method of measuring decenter of a lens according to an embodiment of the present disclosure. For convenience of explanation, descriptions below will be given based on the lens 10 described above with reference to FIGS. 1A through 1C.

To manufacture the lens 10 via injection-molding, a mold for the lens 10 is manufactured. Therefore, measurement of decenter of a lens may be understood as a part of a process for processing a surface contacting an optical surface of the mold at an incidence surface side (the incidence surface 11a of the lens 10) and a surface contacting an optical surface of the mold at an emission surface side (the emission surface 11b of the lens 10).

First, in a first stage, complementary shapes of the reference indicating portion 12 of the lens 10 (referred to hereinafter as 'mold-side reference indicator') are formed on the optical surface of the mold at the incidence surface and the optical surface of the mold at the emission surface (operation S31). To this end, locations of the mold-side reference indicators are set on the optical surfaces of the mold. If a mold-side reference indicator is set at a location where a light beam passes, the mold-side reference indicator affects performance of the manufactured lens 10. Therefore, locations of the mold-side reference indicators are selected from among locations where no light beam passes. For example, as described above with reference to FIGS. 1A through 1C, if a light beam does not pass through the point of origin of the lens 10, the point of origin of an optical surface of the mold may become the location of the mold-side reference indicator. For another example, in cases of the lenses 10', 10", 10''', 20, 20', and 20" as described above with reference to FIGS. 2A through 4B, locations of the optical surface of the mold other than the point of origin may become locations of the mold-side reference indicators. Next, a shape of the mold-side reference indicator is determined, and the mold-side reference indicator is formed on the optical surface of the mold. The formation of the mold-side reference indicator may be continuously performed from an operation for processing the optical surface of the mold. In other words, the formation of the mold-side reference indicator may be performed without moving a processing target (that is, the mold) immediately after the optical surface of the mold is processed to a designed curved surface.

Next, in a second stage, the lens 10 is injection-molded by using the mold (operation S32).

Next, in a third stage, reference indicating portions 12 of the incidence surface 11a and the emission surface 11b of the injection-molded lens 10 are measured (operation S33).

Figure 6A:
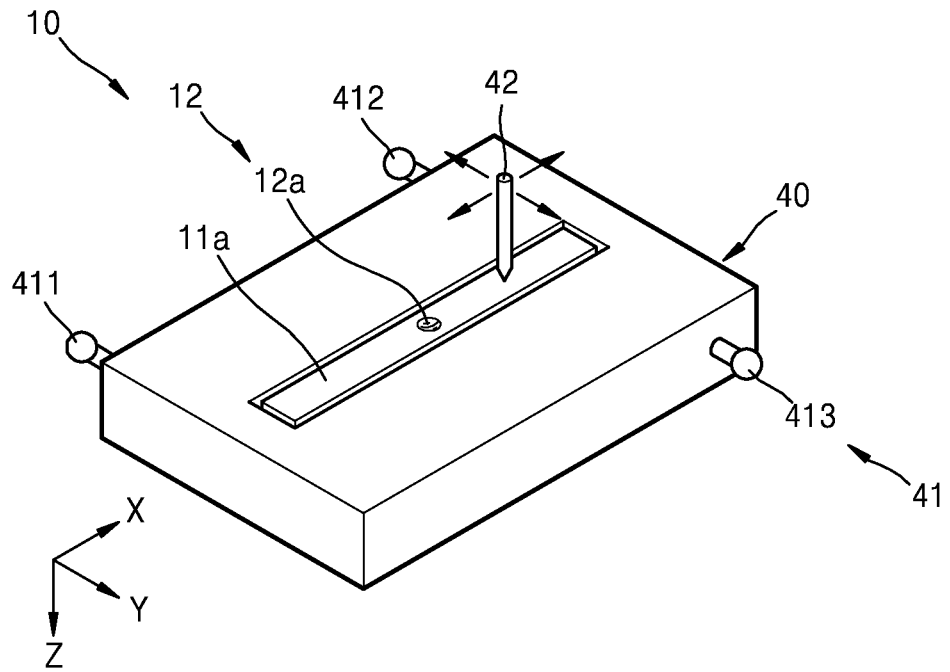
FIGS. 6A and 6B are diagrams showing a method of measuring the reference indicating portions of the lens according to an embodiment of the present disclosure.
Figure 6B:
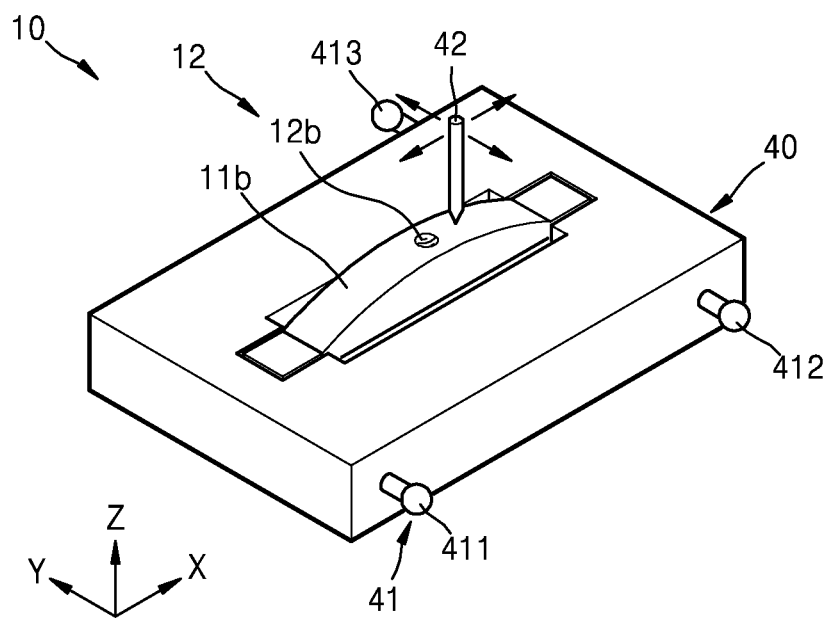

FIGS. 6A and 6B are diagrams showing a method of measuring the reference indicating portions 12 of the lens 10 according to an embodiment of the present disclosure.

Referring to FIG. 6A, a jig 40 of a measuring device fixes the lens 10, such that the incidence surface 11a faces upward. A probe 42 measures location of the first reference point 12a by scanning the incidence surface 11a in the main scanning direction (x-axis direction) and the sub scanning direction (y-axis direction). For example, the first reference point 12a may have a convex hemispheric shape. In this case, coordinates of the first reference point 12a may be precisely detected by scanning the incidence surface 11a using the probe 42, approximating data measured in the main scanning direction (x-axis direction) and the sub scanning direction (y-axis direction) to a circle, and calculating the center location coordinates of a circle. Even if reference points are arranged at locations in the reference indicating portion 12', 12", 12''', 22, 22', and 22" other than points of origin in a measuring target like the lenses 10', 10", 10''', 20, 20', and 20" as described above with reference to FIGS. 2A through 4B, one of ordinary skill in the art will be able to calculate the points of origin by measuring the reference points.

Next, referring to FIG. 6B, the jig 40 is turned upside down to fix the lens 10, such that the emission surface 11b faces upward, and then location of the second reference point 12b is measured by scanning the emission surface 11b of the lens 10 in the main scanning direction (x-axis direction) and the sub scanning direction (y-axis direction) using the probe 42.

Next, in a fourth stage, decenter is calculated by merging the data measured with respect to the incidence surface 11a and the emission surface 11b of the lens 10 (operation S34). By merging coordinates of the first reference point 12a to coordinates of the second reference point 12b, relative locations of the first reference point 12a and the second reference point 12b in the main scanning direction and the sub scanning direction may be obtained. As described above, because the first reference point 12a and the second reference point 12b are arranged at points of origin of the incidence surface 11a and the emission surface 11b, if the first reference point 12a and the second reference point 12b are not aligned in the main scanning direction and/or the sub scanning direction, it means that interfacial decenter occurred. Therefore, a difference between relative locations of the first reference point 12a and the second reference point 12b, that is, a difference between the coordinates of the first reference point 12a and the coordinates of the second reference point 12b corresponds to an amount of interfacial decenter.

Here, to merge the data measured with respect to the incidence surface 11a and the emission surface 11b of the lens 10, it is necessary to fitting points of origin of measured coordinates of the jig 40 with respect to the incidence surface 11a and the emission surface 11b with each other. To this end, a measurement reference unit 41 may be arranged at the jig 40.

Various methods of fitting measured coordinates point of origins of the jig 40 with respect to the incidence surface 11a and the emission surface 11b are known in the art. A unit known in the art for fitting measured coordinates point of origins of the jig 40 with respect to the incidence surface 11a and the emission surface 11b may be employed as the measurement reference unit 41. For example, the measurement reference unit 41 may include first through third reference members 411, 412, and 413 arranged at side surfaces of the jig 40 as shown in FIG. 6A. The first through third reference members 411, 412, and 413 may also hold the lens 10. The first through third reference members 411, 412, and 413 may be arranged on the X-Y plane. The first through third reference members 411, 412, and 413 may have spherical shapes, for example. However, the present disclosure is not limited thereto. The first through third reference members 411, 412, and 413 may have any of various shapes as long as center locations may be detected.

Coordinates point of origin on the X-Y plane may be specified by scanning the first through third reference members 411, 412, and 413, and thus the scan coordinates reference point of the incidence surface 11a and the scan coordinates reference point of the emission surface 11b may coincide.

Next, it is determined whether measured interfacial decenter is smaller than an allowed decenter (operation S35). If the measured interfacial decenter is equal to or smaller than the allowed decenter, it means that errors formed during manufacturing of a mold and deviation based on deformation formed during molding of the lens 10 are within allowed ranges, and thus an operation for measuring an interfacial decenter of the lens 10 is terminated. If the measured interfacial decenter is greater than the allowed decenter, the mold is modified by shifting the point of origin of the optical surface of the mold at an incidence surface side or the optical surface of the mold at an emission surface by a distance corresponding to the interfacial decenter (operation S36) and the operations S31 through S36 are repeated to measure interfacial decenter again. As a result, a mold for molding a lens having an interfacial decenter smaller than the allowed decenter may be manufactured.

Although the description of the above-stated embodiment is given in relation to measurement of the reference indicating portion 12 of the lens 10, the probe 42 may scan the entire incidence surface 11a and the entire emission surface 11b of the lens 10 or parts thereof to obtain measurement data regarding the incidence surface 11a and the emission surface 11b.

A lens 10 according to the embodiment as described above with reference to FIGS. 1A through 1C is manufactured as described below.

First, mold-side reference indicators are formed by forming grooves at point of origins of the optical surface at an incidence surface and the optical surface at an emission surface of a mold for molding a lens by using a bit. The bit has a radius R of 5.0 mm in the sub scanning direction, each of the grooves formed by using the bit (that is, mold-side reference indicators) has a radius R of 10.0 mm and a processed depth of 10 μm.

Next, a lens is molded by using the mold as described above. At the molded lens, portions corresponding to the mold-side reference indicators (that is, the first and second reference points) have a radius of 10.0 mm and a protruding height of 10 μm.

Next, the lens is mounted on a jig and an incidence surface and an emission surface of the lens are scanned in the main scanning direction and the sub scanning direction.

Main scanning coordinates of the first reference point is calculated by approximating measured data regarding the first reference point of the incidence surface of the lens to a circle and calculating the main scanning center of the circle. In the same regard, sub scanning coordinates of the first reference point is calculated. In the same regard, main scanning coordinates and sub scanning coordinates of a second reference point of the emission surface of the lens are calculated. The calculated indicating points of origin are as shown in Tables 1 and 2 below. In Tables 1 and 2 below, x denotes the main scanning direction, y denotes the sub scanning direction, and the unit is mm. For reference purpose, points of origin calculated by using the least square error method are also shown, where the points of origin calculated by using the least square error method differ from the point of origins calculated according to the present embodiment by up to 430 μm.

TABLE 1

|  | x | y |
|---|---|---|
| incidence surface reference point | −4.82001 | −2.44862 |
| incidence surface point of origin (least square error method) | −4.39306 | −2.54862 |

TABLE 2

|  | x | y |
|---|---|---|
| emission surface indication point | −2.09138 | −2.54801 |
| emission surface point of origin (least square error method) | −2.20138 | −2.54101 |

As described above, a jig includes spherical first through third reference members (411, 412, and 413 of FIGS. 6A and 6B) as the measurement reference unit 41, where the measured center points of the first through third reference members are as shown in Tables 3 and 4 below. The unit is mm.

TABLE 3

| Incidence surface coordinates | First reference member | Second reference member | Third reference member |
|---|---|---|---|
| X | −90.44052 | 79.84426 | 80.50982 |
| Y | 70.92675 | 71.87173 | −76.0346 |
| Z | −0.41275 | −0.01028 | −0.489 |

TABLE 4

| Emission surface coordinates | First reference member | Second reference member | Third reference member |
|---|---|---|---|
| X | −87.4753 | 82.81141 | 83.22185 |
| Y | −76.2814 | −76.9334 | 70.97439 |
| Z | −4.09463 | −4.41646 | −3.9383 |

Merged reference points of incidence surface/emission surface are calculated as shown below by rotating coordinates in a direction in which coordinates of the center points of the first through third reference members of the incidence surface and the emission surface overlap each other. The measured data regarding the incidence surface was rotated with respect to the measured data regarding the emission surface. The unit is mm.

TABLE 5

|  | x | y |
|---|---|---|
| second reference point of incidence surface (after merge) | −1.9869 | −2.5564 |

TABLE 6

|  | x | y |
|---|---|---|
| first reference point of emission surface (after merge) | −2.09138 | −2.54801 |

In Tables 5 and 6 above, main scanning/sub scanning relative locations of the first reference point of the incidence surface and the second reference point of the emission surface are found. Calculated interfacial decenter is as shown below. The unit is mm.

TABLE 7

|  | x | y |
|---|---|---|
| decenter | 0.10448 | −0.00839 |

Next, according to the calculated decenter, the mold was modified by shifting the point of origin of the optical surface of the mold at the incidence surface side by 0.104 mm in the main scanning direction and by −0.008 mm in the sub scanning direction.

Next, a result of detecting main scanning/sub scanning relative locations of the first reference point of the incidence surface and the second reference point of the emission surface with respect to a lens molded by using the modified mold is as shown in Table 8 below.

TABLE 8

|  | x | y |
|---|---|---|
| decenter | 0.009138 | −0.00412 |

As described above, according to the method of measuring decenter of a lens according to the present embodiment, points of origin are precisely detected by measuring reference indicating portions instead of detecting point of origins based on the least square error method as in the related art, thereby enabling precise calculation of interfacial decenter. Furthermore, a mold is compensatively modified based on interfacial decenter calculated as described above, thereby reducing interfacial decenter. Furthermore, data regarding shapes of optical surfaces without errors occurring in the method of detecting points of origin using the least square error method in the related art may be obtained, thereby enabling precise evaluation of performance of a lens by using the data.

Because the method of measuring decenter of a lens as described above with reference to FIGS. 5, 6A, and 6B provides a method of precisely measuring and correcting interfacial decenter of a lens, precise lenses may be manufactured, where lenses manufactured based on the method may satisfy optical performances demanded by optical systems of image forming apparatuses and may have a compact configuration.

Figure 7:
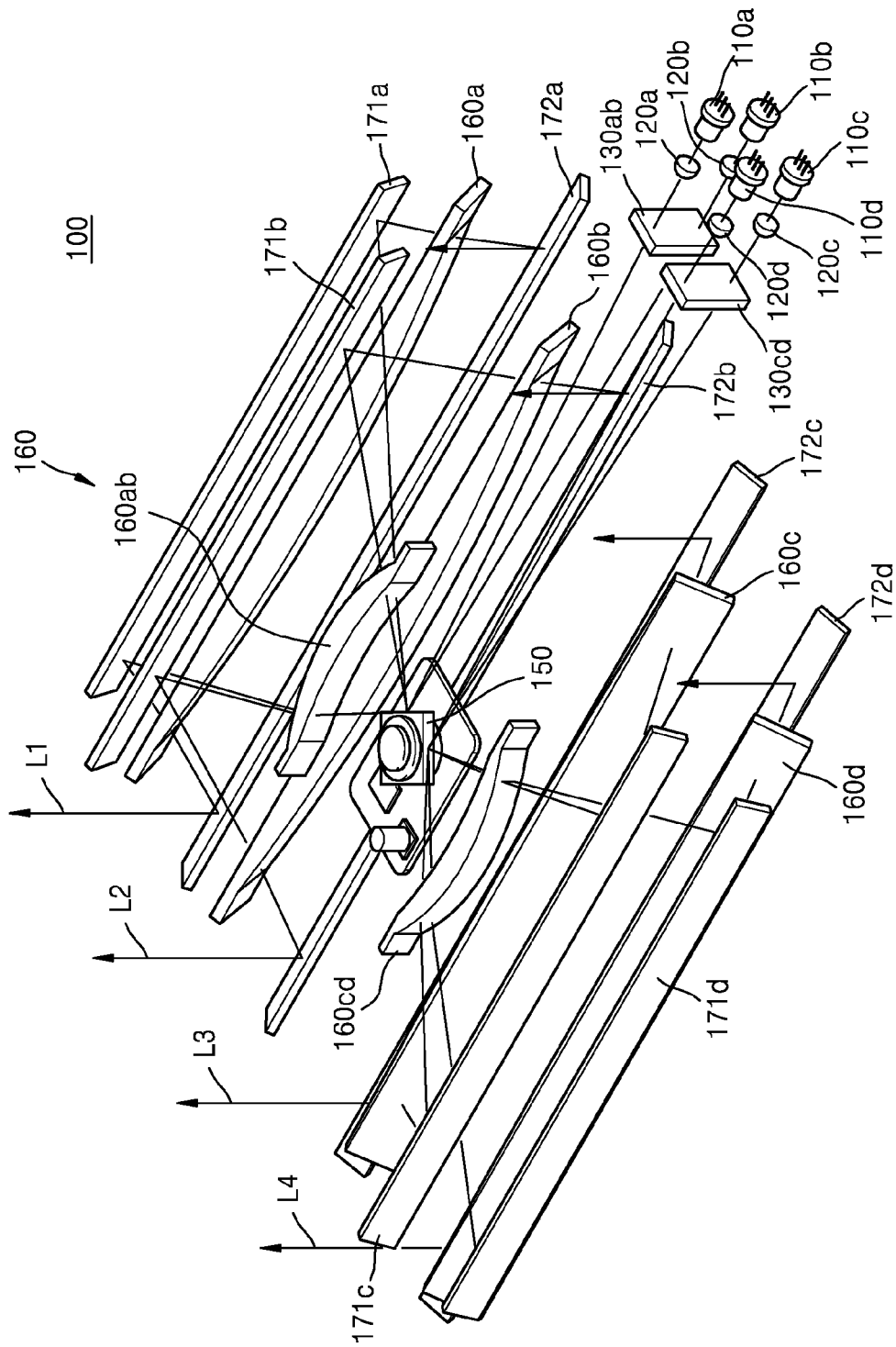
FIG. 7 is a schematic diagram showing an optical system of a light scanning unit according to an embodiment of the present disclosure.

FIG. 7 is a schematic diagram showing an optical system of a light scanning unit 100 according to an embodiment of the present disclosure.

Referring to FIG. 7, the light scanning unit 100 according to the present embodiment employs tilted optics for deflection-scanning four light beams L1, L2, L3, and L4 by using the one light deflector 150. The light scanning unit 100 includes four light sources 110a, 110b, 110c, and 110d. The four light sources 110a, 110b, 110c, and 110d may emit four light beams L1, L2, L3, and L4, which are modulated based on image signals corresponding to image data of black (K), magenta (M), yellow (Y), and cyan (C), respectively.

The light deflector 150 deflection-scans the four light beams L1, L2, L3, and L4 emitted by the four light sources 110a, 110b, 110c, and 110d. For example, the light deflector 150 may be a rotating polygonal mirror having a plurality of reflective surfaces rotating around a rotation axis. As another example, the light deflector 150 may be a micro-electromechanical systems (MEMS) mirror.

Two light sources 110a and 110b from among the four light sources 110a, 110b, 110c, and 110d may be arranged, such that two light beams L1 and L2 emitted thereby are incident to one from among reflective surfaces of the light deflector 150 at designated tilted angles of incidence. Meanwhile, the other two light sources 110c and 110d from among the four light sources 110a, 110b, 110c, and 110d may be arranged, such that two light beams L3 and L4 emitted thereby are incident to one from among reflective surfaces of the light deflector 150 at designated tilted angles of incidence. Here, the angles of incidence of the four light beams L1, L2, L3, and L4 may be set to from approximately 2 degrees to approximately 4 degrees.

Incident optics may be arranged on light paths between the four light sources 110a, 110b, 110c, and 110d and the light deflector 150. The incident optics may include may include collimator lenses 120a, 120b, 120c, and 120d, which are respectively arranged on light paths of the four light beams L1, L2, L3, and L4, and cylindrical lenses 130ab and 130cd. The collimator lenses 120a, 120b, 120c, and 120d are condensing lenses for converting the four light beams L1, L2, L3, and L4 emitted by the four light sources 110a, 110b, 110c, and 110d into parallel light or convergent light. The cylindrical lenses 130ab and 130cd may be anamorphic lenses that form almost linear images of the four light beams L1, L2, L3, and L4 on the reflective surfaces of the light deflector 150 by condensing the four light beams L1, L2, L3, and L4 in a direction corresponding to the sub scanning direction. The one cylindrical lens 130ab may be shared by the two light beams L1 and L2, whereas the other cylindrical lens 130cd may be shared by the other two light beams L3 and L4. Alternatively, a cylindrical lens the same as the cylindrical lenses 130ab and 130cd may be provided for each the four light beams L1, L2, L3, and L4. In some cases, the collimator lenses 120a, 120b, 120c, and 120d and the cylindrical lenses 130ab and 130cd may be replaced with a single optical component. The collimator lenses 120a, 120b, 120c, and 120d and the cylindrical lenses 130ab and 130cd as described above may be lenses with reduced interfacial decenter as described above with respect to FIGS. 1 A through 6B. Meanwhile, aperture stops (not shown) may be arranged on light paths of the four light beams L1, L2, L3, and L4, respectively. The aperture stops shape beam cross-sections (that is, diameters and shapes) of the four light beams L1, L2, L3, and L4.

Imaging optics may be arranged on light paths of the four light beams L1, L2, L3, and L4 deflection-scanned by the light deflector 150. The imaging optics form images of the four light beams L1, L2, L3, and L4 deflection-scanned by the light deflector 150 on outer circumferential surfaces (that is, surfaces to be scanned) of photosensitive drums, respectively. The imaging optics may include scanning lenses 160 having fθ characteristic for correcting the four light beams L1, L2, L3, and L4 to be scanned to the surfaces to be scanned at a constant velocity. For example, the scanning lenses 160 of the imaging optics may include primary scanning lenses 160*ab* and 160*cd* and secondary scanning lenses 160*a*, 160*b*, 160*c*, and 160*d* that are arranged at light paths of the four light beams L1, L2, L3, and L4, respectively. Here, the primary scanning lenses 160*ab* and 160*cd* may be designed to have almost zero (0) refraction index in the sub scanning direction, whereas the secondary scanning lenses 160*a*, 160*b*, 160*c*, and 160*d* may be designed to have demanded refraction indexes in the sub scanning direction. Meanwhile, the secondary scanning lenses 160*a*, 160*b*, 160*c*, and 160*d* closest to a surface to be scanned may be decenter-arranged, such that light beams are deviated in the sub scanning direction from the vertexes of lenses.

As described above, because the light scanning unit 100 according to the present embodiment employs tilted optics, the one primary scanning lens 160*ab* may be shared by the two light beams L1 and L2 that are scanned in parallel to and apart from each other in the sub scanning direction, whereas the other primary scanning lens 160*cd* may be shaped by the other two light beams L3 and L4 that are scanned in parallel to and apart from each other in the sub scanning direction. As described above, because each of the primary scanning lenses 160*ab* and 160*cd* is shared by a pair from among the four light beams L1, L2, L3, and L4, the number of optical components and volume of the light scanning unit 100 may be reduced. Alternatively, a primary scanning lens may be independently arranged with respect to each of the four light beams L1, L2, L3, and L4. Furthermore, although a case in which the imaging optics includes two scanning lenses for each of light paths, the imaging optics may include one scanning lens or three or more scanning lenses for each of lights paths. The primary scanning lenses 160*ab* and 160*cd* and the secondary scanning lenses 160*a*, 160*b*, 160*c*, and 160*d* as described above may be lenses with reduced interfacial decenter as described above with respect to FIGS. 1A through 6B.

Furthermore, a synchronization detecting optics (not shown) for detecting synchronization signals of the four light beams L1, L2, L3, and L4 deflection-scanned by the light deflector 150 may be arranged.

To reduce volume of the light scanning unit 100 and to scan the four light beams L1, L2, L3, and L4 scanned by the light scanning unit 100 in a designated direction, reflective members 171*a*, 171*b*, 171*c*, 171*d*, 172*a*, 172*b*, 172*c*, and 172*d* are arranged. The reflective members 171*a*, 171*b*, 171*c*, 171*d*, 172*a*, 172*b*, 172*c*, and 172*d* may be mirrors or total-reflective prisms. The reflective members 171*a*, 171*b*, 171*c*, 171*d*, 172*a*, 172*b*, 172*c*, and 172*d* are arranged between the scanning lenses 160 of the imaging optics or between the imaging optics and a surface to be scanned and appropriately modify light paths.

The light scanning unit 100 according to the present embodiment as described above employs tilted optics, thereby reducing the number of optical components. As a result, material costs and volume of the light scanning unit 100 may be reduced. In designing the light scanning unit 100 as tilted optics, it is necessary to precisely manufacture lenses used therefore, that is, the collimator lenses 120*a*, 120*b*, 120*c*, and 120*d* and the cylindrical lenses 130*ab* and 130*cd* of the incidence optics or the scanning lenses 160 of a tilted optics, where the lenses and the methods of measuring decenter of lenses may satisfy the needs.

The light scanning unit 100 according to the present embodiment is merely an example, and the lenses and the methods of measuring decenter of lenses as described above with reference to FIGS. 1A through 6B may also be applied to lenses of a light scanning unit employing non-tilted optics or a light scanning unit that scans a single light beam using a single light deflector.

Figure 8:
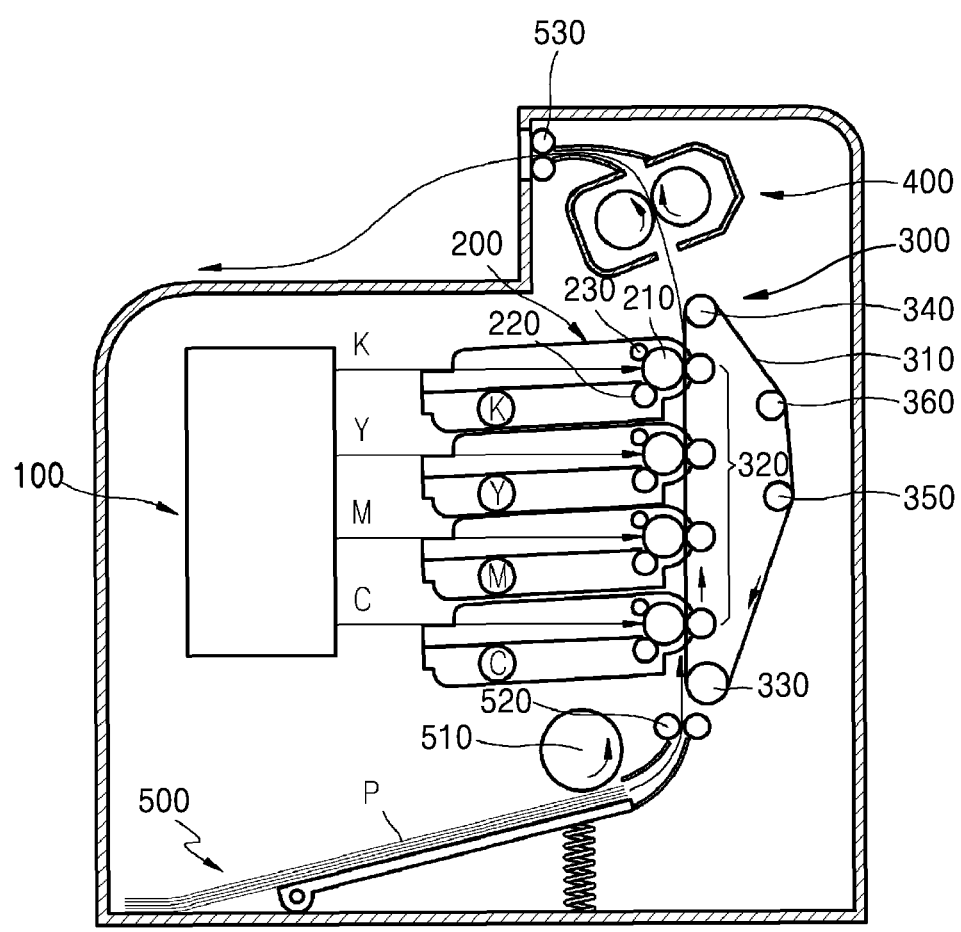
FIG. 8 is a diagram showing an image forming apparatus according to an embodiment of the present disclosure.

FIG. 8 is a diagram showing an image forming apparatus according to an embodiment of the present disclosure. The image forming apparatus shown in FIG. 8 is a dry electrophotography type image forming apparatus that prints color images by using dry developers (referred to hereinafter as 'toners').

The image forming apparatus includes the light scanning unit 100, a developer 200, a transferring unit 300, and a fixing unit 400.

The image forming apparatus may be the apparatus as described above with reference to FIG. 7. To print a color image, the light scanning unit 100 scans a plurality of light beams, and the developers 200 may be arranged in correspondence to the plurality of light beams for the respective colors. For example, the light scanning unit 100 scans four light beams corresponding to colors including black (K), magenta (M), yellow (Y), and cyan (C), where one developer 200 may be arranged for each of the colors including black (K), magenta (M), yellow (Y), and cyan (C). Instead of the light scanning unit 100 as described above with reference to FIG. 7, a plurality of light scanning units for scanning a single light beam may be arranged.

The developer 200 includes a photosensitive drum 210, which is an image receptor for forming an electrostatic latent image thereon, and a developing roller 220 for developing the electrostatic latent image.

The photosensitive drum 210 is an example of photosensitive bodies is formed by forming a photosensitive layer having a designated thickness on the outer circumference surface of a cylindrical metal pipe. Although not shown, a belt-type photosensitive belt may be employed as a photosensitive body. The outer circumference surface of the photosensitive drum 210 becomes a surface to be exposed. On the outer circumference surface of the photosensitive drum 210, a charging roller 230 is arranged at the upstream side of a location exposed by the light scanning unit 100. The charging roller 230 is an example of charging device that contacts the photosensitive drum 210, rotates, and charging the surface of the photosensitive drum 210 to an uniform potential. A charging bias is applied to the charging roller 230. Instead of the charging roller 230, a corona charger (not shown) may be used.

The developing roller 220 attaches toners on the outer circumference surface of the developing roller 220 and supplies to toners to the photosensitive drum 210. A developing bias for supplying toners to the photosensitive drum 210 is applied to the developing roller 220. Although not shown, the developer 200 may include a supplying roller for attaching toners accommodated inside the developer 200 to the developing roller 220, a limiting unit for limiting an amount of toners attached to the developing roller 220, and a mixer for transporting toners accommodated inside the developer 200 toward the supplying roller and/or the developing roller 220.

The transferring unit 300 may include a paper carrying belt 310 and four transferring rollers 320. The paper carrying belt 310 faces the outer circumference surface of the developer 200 exposed to outside. The paper carrying belt 310 is supported by a plurality of supporting rollers 330, 340, 350, and 360 and is circulatively driven. The four transferring rollers 320 are arranged at locations to face the photosensitive drums 210 of the developers 200 across the paper carrying belt 310, respectively. A transfer bias is applied to the transferring rollers 320.

A process of forming a color image based on the above-stated configuration will be described.

Each of the photosensitive drums 210 of the developer 200 is charged to a uniform potential by a charging bias applied by the charging roller 230. The light scanning unit 100 forms an electrostatic latent image by scanning four light beams corresponding to image data regarding colors including cyan, magenta, yellow, and black to the photosensitive drums 210 of the developer 200, respectively. A developing bias is applied to the developing roller 220. As a result, toners attached to the outer circumference surface of the developing roller 220 are attached to the electrostatic latent image, and thus cyan, magenta, yellow, and black toner images are formed on the photosensitive drums 210 of the developer 200, respectively.

A medium that finally receives toners, e.g., a paper P, is taken out of a cassette 500 by a pickup roller 510. The paper P is introduced into a paper carrying belt 310 by a transferring rollers 320. The paper P is electrostatically attached to a surface of the paper carrying belt 310 and is transported at a same velocity as the linear driving velocity of the paper carrying belt 310.

For example, at a time point that a leading end of a cyan toner image formed on the outer circumference surface of one of the photosensitive drums 210 of the developer 200 arrives at a transfer nib facing the transferring rollers 320, a leading end of the paper P arrives at the transfer nib. When a transfer bias is applied to the transferring rollers 320, the toner image formed on the photosensitive drum 210 is transferred to the paper P. As the paper P is transported, the magenta (M), yellow (Y), and black (K) toner images formed on the photosensitive drums 210 of the developer 200 are sequentially overlap-transferred to the paper P, and thus a color toner image is formed on the paper P.

The color toner image transferred to the paper P is electrostatically attached to a surface of the paper P. The fixing unit 400 fixes the color toner image to the paper P by using heat and pressure. The fixed paper P is taken out of the image forming apparatus by a discharging roller 530.

According to lenses and methods of measuring decenter thereof according to embodiments of the present disclosure, a shape of a lens may be precisely measured, a point of origin may be precisely detected, and decenter may be calculated.

According to lenses and methods of measuring decenter thereof according to embodiments of the present disclosure, a mold may be compensatively processed according to a calculated decenter, thereby reducing decenter.

According to lenses and methods of measuring decenter thereof according to embodiments of the present disclosure, optical surface shape data may be obtained without errors occurring in a method of detecting points of origin based on the least square error method in the related art, and thus lens performance may be precisely evaluated based on the same.

A light scanning unit and an electrophotography type image forming apparatus according to embodiments of the present disclosure employs lenses with minimized decenter, thereby improving printing quality.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present disclosure have been described with reference to the figures, it will be understood by those of ordinary skill in the art that various changes in form and details may be made therein without departing from the spirit and scope of the present disclosure as defined by the following claims.

The invention claimed is:

1. An electrophotography type image forming apparatus comprising:
   a light scanning unit comprising:
      a light source to emit a light beam;
      a light deflector to deflect the light beam emitted by the light source and scan the deflected light beam in a main scanning direction;
      incidence optics to lead the light beam emitted by the light source to be incident to the light deflector; and
      imaging optics to form an image of the light beam deflection-scanned by the light deflector on a surface to be scanned,
      wherein
      the imaging optics comprise a lens including effective optical surfaces, and
      reference indicating portions to measure a decenter of the lens are arranged on the effective optical surfaces;
   a developer comprising: a photosensitive body, which is arranged where the image formed by the imaging optics is formed, to form an electrostatic latent image thereon; and
      a developing roller to develop the electrostatic latent image formed on the photosensitive body; and
   a transferring unit to transfer an image developed by the developer onto a printing medium,
   wherein the lens is formed to extend in the main scanning direction to cover the entire light beam scanned by the light deflector,
   wherein the effective optical surfaces comprise an emission surface and an incidence surface of the lens, and the reference indicating portions comprise at least one first reference point formed on the emission surface and at least one second reference point formed on the incidence surface of the lens, and
   wherein the at least one first reference point and the at least one second reference point are formed at regions of the emission surface and the incidence surface of the lens other than regions through which the light beam effectively passes.

2. The electrophotography type image forming apparatus of claim 1, wherein
   the at least one first reference point is arranged at a point of origin of the emission surface of the lens, and
   the at least one second reference point is arranged at a point of origin of the incidence surface of the lens.

3. The electrophotography type image forming apparatus of claim 1, wherein
   the at least one first reference point comprises a plurality of first reference points symmetrically arranged on the emission surface of the lens around a point of origin of the emission surface at regions other than the point of origin of the emission surface, and
   the at least one second reference point comprises a plurality of second reference points symmetrically arranged on the incidence surface of the lens around a point of origin of the incidence surface at regions other than the point of origin of the incidence surface.

4. The electrophotography type image forming apparatus of claim 1, wherein
the at least one first reference point is arranged on a main scanning line passing through a point of origin of the emission surface of the lens, and
the at least one second reference point is arranged on a main scanning line passing through a point of origin of the incidence surface of the lens.

5. The electrophotography type image forming apparatus of claim 1, wherein
the at least one first reference point is arranged on a sub scanning line passing through a point of origin of the emission surface of the lens, and
the at least one second reference point is arranged on a sub scanning line passing through a point of origin of the incidence surface of the lens.

6. The electrophotography type image forming apparatus of claim 1, wherein
the at least one first reference point comprises a plurality of first reference points arranged symmetrically with respect to a main scanning line passing through a point of origin of the emission surface of the lens, and
the at least one second reference point comprises a plurality of second reference points arranged symmetrically with respect to a main scanning line passing through a point of origin of the incidence surface of the lens.

7. The electrophotography type image forming apparatus of claim 1, wherein
the at least one first reference point comprises a plurality of first reference points arranged symmetrically with respect to a sub scanning line passing through a point of origin of the emission surface of the lens, and
the at least one second reference point comprises a plurality of second reference points arranged symmetrically with respect to a sub scanning line passing through a point of origin of the incidence surface of the lens.

8. The electrophotography type image forming apparatus of claim 1, wherein the at least one first reference point and the at least one second reference point comprise at least one of a hemispherical protrusion, a cylindrical protrusion, an elliptical protrusion, a polygonal protrusion, a hemispherical groove, a cylindrical groove, an elliptical groove, and a polygonal groove.

9. The electrophotography type image forming apparatus of claim 8, wherein
the light source emits at least one light beam,
the imaging optics comprises a scanning lens through which one light beam passes, and
first reference points and second reference points of the lens are respectively arranged symmetrically with respect to a sub scanning line on the incidence surface and the emission surface of the scanning lens around scanning regions to which the one light beam is scanned.

10. The electrophotography type image forming apparatus of claim 1, wherein
the imaging optics comprise a scanning lens having an fθ characteristic to correct light beams to be scanned to the surface to be scanned at a constant velocity, and
the reference indicating portions to measure the decenter are arranged on effective optical surfaces of the scanning lens.

11. The electrophotography type image forming apparatus of claim 10, wherein the incidence optics and the imaging optics are tilted optics in which the at least two light beams are incident to one of reflective surfaces of the light deflector at tilted angles.

12. The electrophotography type image forming apparatus of claim 1, wherein
the light source emits at least two light beams,
the imaging optics comprise a scanning lens through which the at least two light beams pass, and
a first reference point and a second reference point of the lens are arranged on the incidence surface and the emission surface of the scanning lens, respectively, at regions other than transmissive regions through which the at least two light beams pass.

* * * * *